Figure 1:
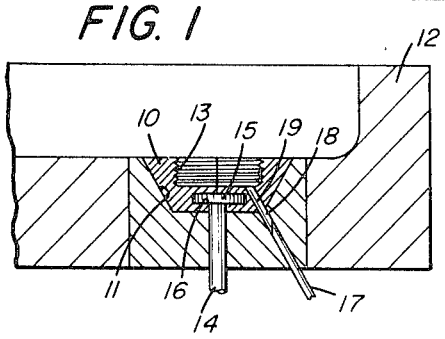
PRIOR ART FIG. 1
Figure 2:
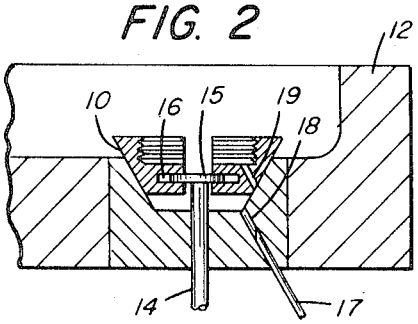
Figure 4:
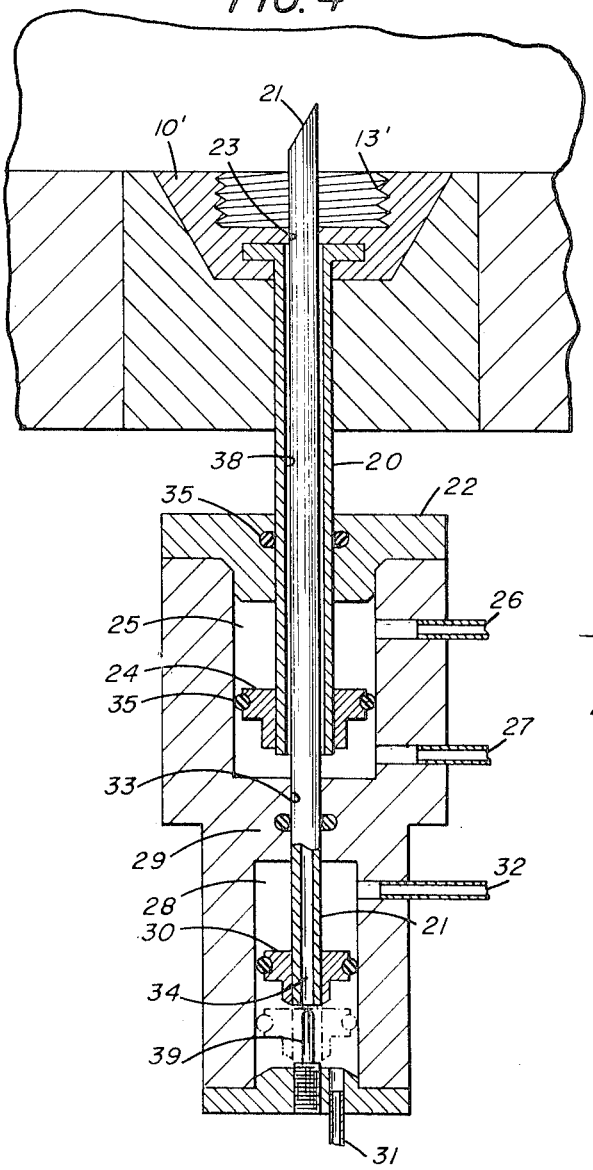
Figure 3:
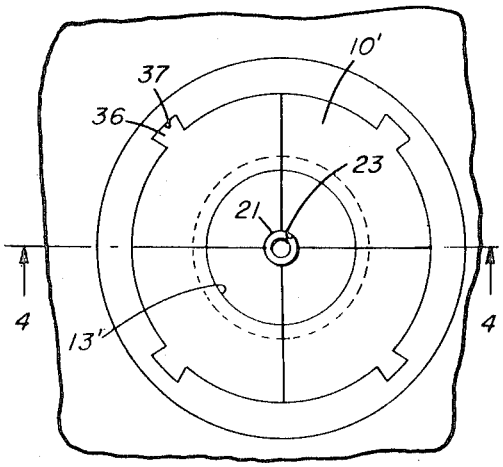

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED SEPTEMBER 21, 1971

890 O.G. 982

T890,013
APPARATUS FOR BLOW MOLDING UNDERCUT ARTICLES

Ray H. Lawrence, West Henrietta, N.Y.
(1669 Lake Ave., Rochester, N.Y. 14650)

Filed Feb. 1, 1971, Ser. No. 111,383
Int. Cl. B29d *23/03*
U.S. Cl. 18—5BB
1 Sheet Drawing. 11 Pages Specification

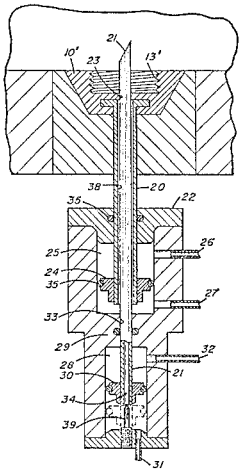

An apparatus for use in the blow molding of articles having undercut portions, such as neck threads. The undercut portion is cooperatively molded by means of sector-shaped inserts mounted on mutually inclined slideways formed in one of the mold halves. Sliding movement in one direction causes the inserts to merge and form a mold for the undercut portion, while movement in the opposite direction separates the inserts from the finished article. The inserts are centrally engaged and driven by a hollow actuator rod which is itself reciprocally driven by a piston in one chamber of a double-chambered fluid pressure cylinder. A blow pin, reciprocally driven by a piston in the other chamber, is slidably received within the actuator rod for movement independent thereof. The blow pin is also freely movable at all times with respect to the inserts since, depending upon the position of the inserts, the pin may pass either through a cooperatively formed aperture or between the separated inserts. A stationary plug seals the blow pin at its trailing end and prevents premature blowing by restricting the entry of blowing fluid into the pin until the pin has moved forward a sufficient distance to pierce the parison.

Sept. 21, 1971 R. H. LAWRENCE T890,013

APPARATUS FOR BLOW MOLDING UNDERCUT ARTICLES

Filed Feb. 1, 1971

RAY H. LAWRENCE
INVENTOR.

BY Robert F. Crocker

ATTORNEY